Oct. 27, 1953     L. W. BEDKER     2,656,740
METHOD OF MAKING THREAD CUTTING TAPS
Filed Nov. 20, 1950
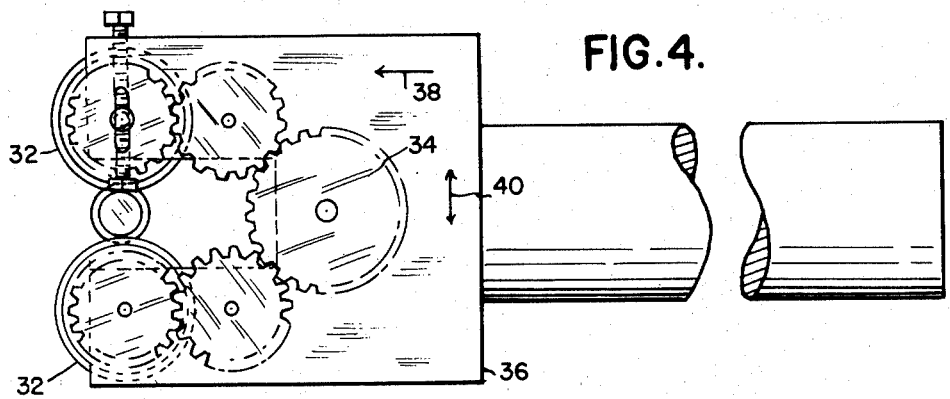
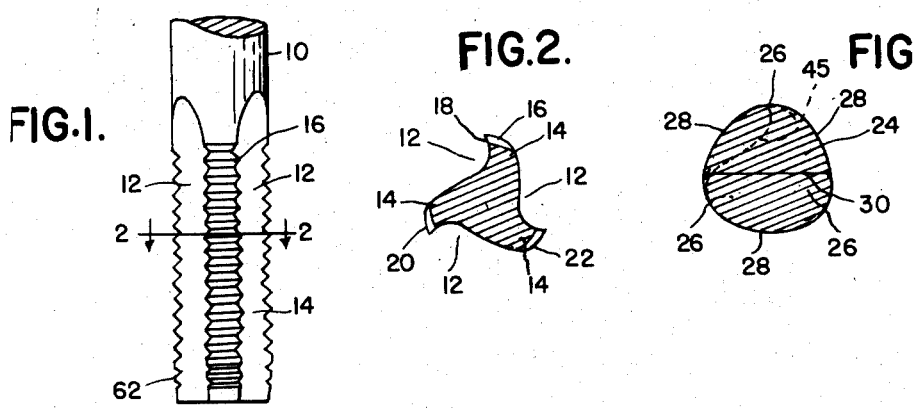
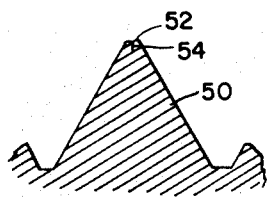
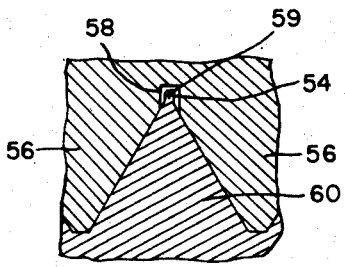
INVENTOR.
LEO W. BEDKER
BY Whittemore
Hulbert & Belknap
ATTORNEYS Patented Oct. 27, 1953

2,656,740

UNITED STATES PATENT OFFICE 2,656,740

METHOD OF MAKING THREAD CUTTING TAPS

Leo W. Bedker, East Detroit, Mich., assignor of one-half to Emma G. Bedker, East Detroit, Mich.

Application November 20, 1950, Serial No. 196,627

5 Claims. (Cl. 76—101)

The present invention relates to thread taps and method of making the same.

It is an object of the present invention to provide a method of producing thread taps in which the threads are formed on the stock by a rolling operation.

It is a further object of the present invention to provide an improved thread tap characterized by thread cutting elements having improved physical properties due to the method of production.

It is a feature of the present invention to provide a novel method of making thread taps in which stock is initially preformed to a lobar cross-section characterized by a constant transverse diameter, threads are thereafter rolled onto the stock, flutes are formed and the tap is thereafter hardened.

Other objects and features of the invention will become apparent as the description proceeds, especially when taken in conjunction with the accompanying drawings, wherein:

Figure 1 is a fragmentary end view of a thread tap.

Figure 2 is a transverse section on the line 2—2, Figure 1.

Figure 3 is a transverse sectional view through stock at the point thereof where threads are to be rolled.

Figure 4 is a fragmentary view illustrating the relationship between thread rolls and the stock during the rolling operation.

Figure 5 is a diagrammatic sectional view through a rolled thread.

Figure 6 is a diagrammatic transverse sectional view illustrating the necessary modification of a special tool employed to roll the threads on the tap and the relationship between the tool and the tap during the rolling operation.

Referring now to the drawings, in Figures 1 and 2 there is illustrated a three-fluted thread tap. As seen in these figures the thread tap comprises a shank, a portion of which is indicated at 10, three flutes 12, and intermediate the flutes three thread cutting ribs 14. Each of the ribs 14 at its top is provided with threads 16 and each flute is formed to provide cutting edges at the advance end of the threads. Preferably, the flutes are undercut so as to provide positive rake as indicated at 18. The tops of the threads require cutting clearance in back of the leading cutting edges thereof, although this may vary in specific designs of taps. Thus, in some taps it is desirable to provide a short land section as indicated at 20 which is concentric or substantially concentric with the tap so that the tap may be repeatedly reground without changing the dimensions. However, rearwardly of the land section it is desirable for the top of the threads to converge inwardly at a small angle as indicated at 22, to provide top or outside cutting clearance.

In the past, taps of this kind have been ground and the operation of grinding the relief or top cutting clearances at 16 is a time-consuming and expensive operation. According to the present invention the grinding of the threads, both to provide the thread form and to provide the necessary cutting clearance, is eliminated. According to the present invention the taps are formed from stock initially preshaped to lobar cross-section as indicated in Figure 3. In this figure there is illustrated a three-lobe bar stock element 24 having high points at 26 and low points at 28. It will be observed that each high point 26 is directly opposite a low point 28 which permits the cross-sectional shape of the stock to be such that any diameter, one of which is indicated at 30, is of the same length. While three-lobe stock is illustrated in Figure 1, it is obvious that the lobes may be of any odd number.

Having initially formed bar stock into lobar cross-section as indicated in Figure 3, threads are thereafter rolled thereon in any convenient manner. Thus, the rolling operation may be performed employing opposed thread rolls or employing opposed flat thread die plates. In Figure 4 the operation is illustrated as being carried out on a fixture mounting opposed thread rolls 32 interconnected by a train of gears indicated generally at 34. The thread rolls 32 are spaced apart a distance determined by the diametrical dimension 30 of the bar stock. Thereafter, the bar stock is rotated while the thread roll holder 36 is advanced in the direction of the arrow 38 to cause the thread rolls 32 to assume a position diametrically opposed to each other across the rotating stock 24. This latter position is illustrated in the figure.

Due to the lobar cross-sectional shape of the stock the holder 36 will oscillate back and forth in the direction of the arrow 40 while it remains in the position shown and the bar stock 24 continues to rotate. In practice the holder 36 is quickly advanced to the illustrated position and immediately retracted so that the thread rolling operation is completed in a very brief interval of time. If desired, the thread rolls may be disposed with their axes extending at a small angle to the axis of the work piece, as taught in my prior copending applications, Serial No. 694,585 filed September 3, 1946, and Serial No. 167,533 filed June 12, 1950.

The thread thus formed on the rotating work piece is slightly modified from a standard helical thread due to the fact that it is produced on stock having lobes thereon. However, the portions of the threads extending across the lobes of the stock and for a substantial distance at either side of the crests of the lobes, is indistinguishable from a true helical thread.

After the stock has been threaded as above described or by an equivalent operation employing opposed thread rolling die plates, the flutes are formed in the stock by milling or other operation and thereafter the tap is hardened. The flutes will of course be located with reference to the high points 26 of the lobes such that the top relief is present on the tops of the threads. Thus in Figure 3 the dotted line illustrated at 45 indicates the flutes provided so as to intersect the extreme high point 26 of the lobe. This position of the flute results in a surface directly back of the cutting edge which is substantially concentric with the tap for a short distance and which thereafter falls away to provide top clearance. This position of the flute provides the maximum stock for regrinding. However, the flute may be positioned further around in the direction opposite to rotation of the tap so as to provide more top clearance immediately in back of the cutting edges.

Due to the fact that the tap is employed in a cutting operation the crests of the threads at the intersection of the rear face 18 of the flutes, undergoes the greatest stress, and accordingly these crests of the threads must be particularly strong. The thread rolling operation improves the strength of the threads due to the fact that the structure of the stock is brought into more or less parallelism with the sides of the threads. However, as ordinarily carried out in producing threads on a work piece, the thread rolling operation normally produces crests on the threads which are characterized by a shallow crack or crevice extending along the thread. This condition is illustrated in Figure 5 where a thread 50 is illustrated at the crests of which are shown two rolls of metal 52 separated by a shallow crack or crevice 54. This crack or crevice is the result of the fact that the metal is rolled up into the thread uniformly from both sides. In order to avoid the weakening of the crests of the threads on the tap the thread rolling operation which produces the tap is carried out by a special rolling tool, a portion of which is illustrated in Figure 6 in which a portion of the tool is shown in cooperating relationship with a portion of the stock. As seen in this figure, the special tool which is employed to roll the stock is provided with threads 56 and between the threads at the roots thereof there is provided a channel 58 which is of a depth such to permit rolling of stock from the thread 60 of the stock into the channel to a depth sufficient to permit a subsequent grinding operation to remove that portion of the crest containing the crack or crevice 54. The side walls 59 of the channel are either parallel or slightly outwardly converging to permit the extreme crest portion of the rolled thread to be withdrawn from the channel as the rolling operation takes place. Thus when the rolling operation is completed there is produced a thread form on the tap which may thereafter be cylindrically ground so as to remove the extreme tip portion of the rolled thread containing the crack or crevice 54. This is true whether the thread form on the tap is to be sharp or is to have a flat land at its crest.

Inasmuch as the entering end of the tap is ordinarily ground on a taper as indicated at 62 in Figure 1, the removal of the excess material at the cest of the rolled thread which contains the crack or crevice 54 does not even require an extra operation since it may be removed by grinding at the same time as the taper is imparted to the entering end of the tap.

The fact that the threads are produced by a rolling operation causes the characteristics of the metal in the threads to be superior due to the favorable disposition of the grain and this carries through into the finished product to produce a tap having thread cutting elements of superior physical properties.

If it is desired to produce taps having an even number of flutes the invention may be practiced with a holder containing three thread rolls mounted in a holder which is permitted to move universally in a plane perpendicular to the axis of the work piece.

The drawings and the foregoing specification constitute a description of the improved thread tap and method of making the same in such full, clear, concise and exact terms as to enable any person skilled in the art to practice the invention, the scope of which is indicated by the appended claims.

What I claim as my invention is:

1. The method of making thread cutting taps which comprises forming stock to lobar cross-section of constant diameter, thereafter rolling threads thereon to roll excess metal beyond the crests of the threads on the taps, and thereafter forming flutes in the threaded portion in such relation to the lobes as to provide top clearance in back of the cutting edges and removing the excess metal beyond the crests of the threads on the taps.

2. The method defined in claim 1 in which the excess metal is removed by a grinding operation in which the entering ends of the taps are tapered.

3. The method of claim 1 in which the lobes on the stocks are an odd number and the rolling operation is carried out by a pair of opposed thread rolls.

4. The method of making thread cutting taps which comprises forming bar stock to a cross-section presenting a plurality of lobes extending parallel to the axis thereof, thereafter rolling threads on said stock, and rolling excess metal beyond the desired crests of the threads on the taps, forming flutes intermediate said lobes, and removing the excess metal from the tap threads to shape them to desired form.

5. The method of making thread cutting taps which comprises forming elongated stock to a lobar cross-section having a continuous convex curved surface and being of uniform transverse dimension, thereafter rolling threads thereon by relatively moving said stock and a pair of opposed thread rolls generally perpendicular to the length of the stock to position the stock between the opposed pair of thread rolls to form continuous threads extending completely around the circumference of said stock, and thereafter removing material from the stock to form flutes extending longitudinally of the stock generally intermediate each adjacent pair of lobes.

LEO W. BEDKER.

References Cited in the file of this patent

UNITED STATES PATENTS

| Number | Name | Date |
|---|---|---|
| 186,904 | Vanstone et al. | Jan. 30, 1877 |
| 327,261 | Harvey | Sept. 29, 1885 |
| 827,533 | Johnson | July 31, 1906 |
| 832,380 | Hartness | Oct. 2, 1906 |
| 1,503,959 | McFarlane et al. | Aug. 5, 1924 |
| 1,525,536 | Debrot | Feb. 10, 1925 |
| 1,875,362 | Wells | Sept. 6, 1932 |
| 2,058,351 | Pruitt | Oct. 20, 1936 |
| 2,232,336 | Meersteiner | Feb. 18, 1941 |
| 2,325,627 | Neilson | Aug. 3, 1943 |

FOREIGN PATENTS

| Number | Country | Date |
|---|---|---|
| 219,217 | Switzerland | Jan. 31, 1942 |

OTHER REFERENCES

Thread Rolling Hand Book, Catalog 9, July 1, 1943, pages 51 to 55; Rolled Thread Die Co., Worcester, Mass. Copyright 1943.